United States Patent Office 3,317,557
Patented May 2, 1967

3,317,557
16-AZASTEROIDS AND INTERMEDIATES
THEREFOR
Richard Wightman Kierstead, North Caldwell, N.J., assignor to Hoffmann-La Roche Inc., Nutley, N.J., a corporation of New Jersey
No Drawing. Filed June 21, 1965, Ser. No. 465,763
20 Claims. (Cl. 260—325)

This application is a continuation-in-part of application Ser. No. 407,583, filed Oct. 29, 1964, and now abandoned.

The present invention relates to the preparation of steroids and more particularly relates to processes and intermediates for the preparation of 16-azasteroids.

The compounds of the invention have the formula

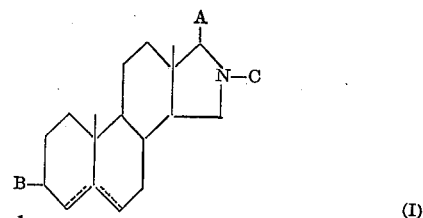

wherein C is hydrogen, $$-CH_2R \text{ or } -\overset{O}{\underset{\|}{C}}R$$

A is hydrogen or oxo; B is hydroxy, oxo, or $$-O\overset{O}{\underset{\|}{C}}R$$

wherein R is hydrogen, lower alkyl, lower alkenyl, cycloalkylloweralkyl, or phenyl, and not more than one of the dotted lines is a solid line.

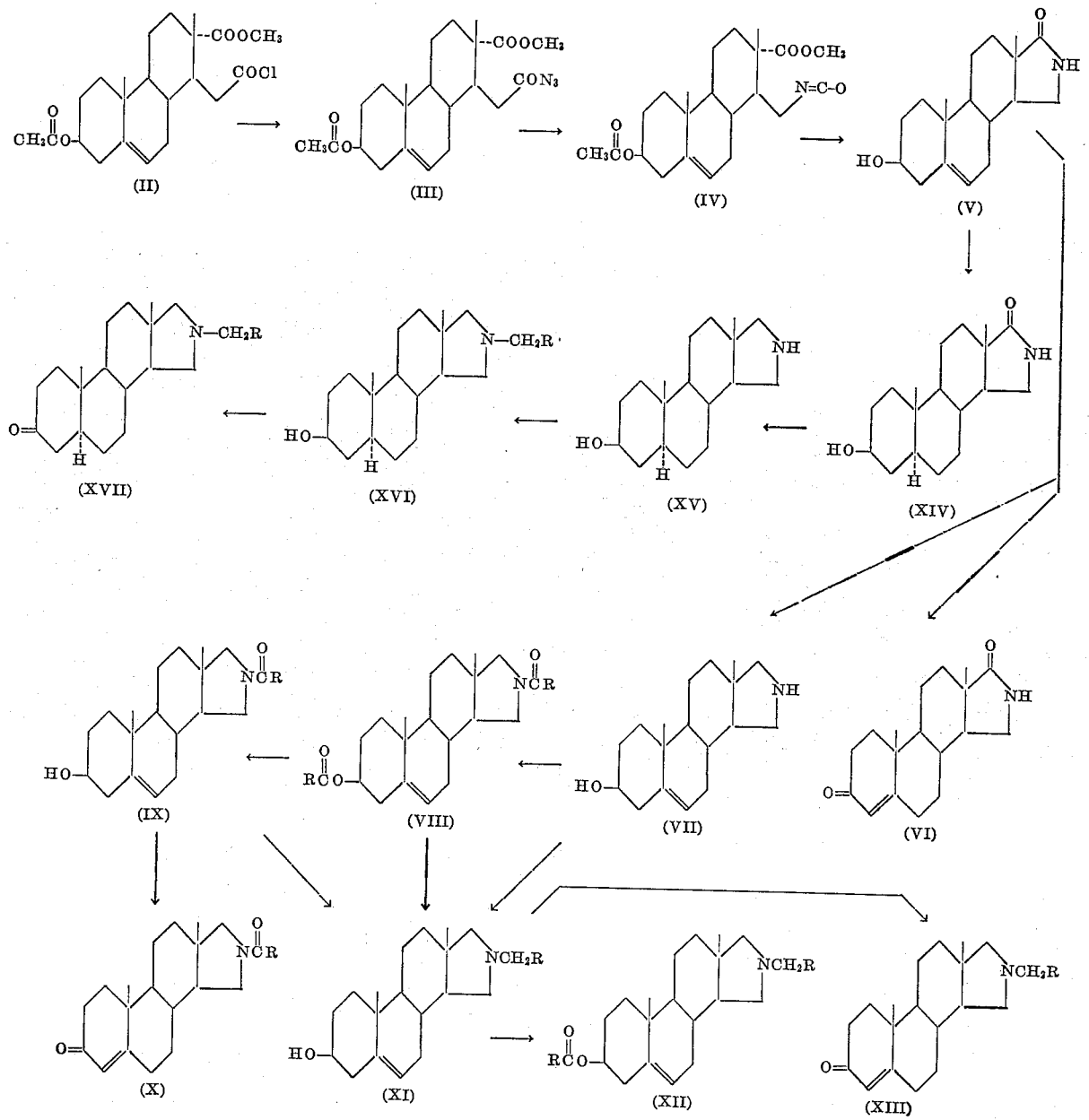

Compounds of the above Formula I and their acid addition salts with pharmaceutically acceptable acids have hypotensive and antidepressant activity and are useful as hypotensive agents and antidepressants. The term "pharmaceutically acceptable acids" includes the mineral acids such as hydrochloric, hydrobromic, hydriodic, nitric, sulfuric, phosphoric, etc., and organic acids, e.g., acetic, citric, tartaric, lactic, benzenesulfonic, etc.

A typical dose for the animal body is in the range of about 0.5 to about 20 mg./kg. body weight. The compounds can be administered orally or parenterally in compositions with known pharmaceutical adjuvants according to standard compounding techniques well known to those in the pharmaceutical formulating art.

When used in the specification and claims, the term "lower alkyl" is to be understood to refer to straight or branched chain alkyl groups having from 1 to 7 carbon atoms, e.g., methyl, ethyl, propyl, butyl, isobutyl, hexyl, etc.; the term "lower alkenyl" means a lower alkyl group as above defined which contains one double bond, e.g., allyl, 2-methyl-butenyl, etc. The term "cycloalkylloweralkyl" means a cycloakylloweralkyl group where in the cycloalkyl moiety has from 3 to 7 carbon atoms, e.g., cyclopropylloweralkyl, such as cyclopropylmethyl, etc.

The processes of the invention are carried out according to the preceding reaction scheme in which R has the meaning given above.

In the above reaction scheme, the acetate of 1,2,3,4,4a, 4b,5,6,7,8,10,10a - dodecahydro - 7-hydroxy-1-chlorocarbonylmethyl-2,4b-dimethyl-2-phenanthrenecarboxylic acid methyl ester (II) is reacted with an alkali metal azide, e.g. sodium azide to give the acetate of 1,2,3,4,4a,4b,5, 6,7,8,10,10a - dodecahydro - 7 - hydroxy-1-azidocarbonylmethyl - 2,4b - dimethyl - 2-phenanthrenecarboxylic acid methyl ester (III). This step of the reaction is preferably carried out in an organic solvent miscible with, and containing, water, such as aqueous acetone, aqueous ethanol, aqueous dioxane, aqueous acetic acid, etc. However, inert solvents immiscible with, and not containing, water, such as benzene, toluene, xylene, nitrobenzene, ether, etc., can also be employed. The acetate of 1,2,3,4,4a,4b,5,6, 7,8,10,10a - dodecahydro - 7 - hydroxy-1-azidocarbonylmethyl - 2,4b - dimethyl-2 - phenanthrenecarboxylic acid methyl ester (III) is then heated, preferably in the presence of an organic solvent, e.g., a hydrocarbon solvent, such as benzene, toluene, heptane, etc.; a halogenated; e.g., chlorinated aliphatic solvent such as chloroform; a high boiling ether (e.g., boiling at about 80° C. or above), etc., at a temperature in the range of from about 20 to about 150°, preferably in refluxing benzene, to give the acetate of 1,2,3,4,4a,4b,5,6,7,8,10,10a-dodecahydro-7-hydroxy - 1 - isocyanatomethyl-2,4b-dimethyl-2-phenanthrenecarboxylic acid methyl ester (IV). Compound IV is then treated with aqueous alkali, e.g., sodium hydroxide, potassium hydroxide, etc., to give 3β-hydroxy-16-azaandrost-5-en-17-one (V). This step of the reaction is preferably carried out in an organic solvent, e.g., a lower alkanol, preferably methanol, at a temperature in a range of from about 25 to about 100°, in an inert atmosphere, e.g., a nitrogen atmosphere. A portion of compound V is then heated with aluminum isopropoxide and a ketone, e.g., acetone, cyclohexanone, etc., to form 16-azaandrost-4-en-3,17-dione (VI). This reaction is preferably carried out in an inert solvent, e.g., a hydrocarbon solvent such as benzene, toluene; an ether such as dioxane; etc. Another portion of compound V is treated with a group I metal-group III metal hydride, e.g., lithium aluminum hydride, etc., in an ether, e.g., dioxane at a temperature in a range of from about 25 to about 100°, preferably under reflux, and preferably in an inert atmosphere, such as a nitrogen atmosphere, to give 3β-hydroxy-16-azaandrost-5-ene (VII).

A portion of compound VII is reacted with a methylating agent such as formic acid and formaldehyde preferably under reflux conditions, and preferably in an inert atmosphere such as a nitrogen atmosphere, followed by treatment of the reaction product with an aqueous alkali, to give 3β-hydroxy-N-methyl-16-azaandrost-5-ene (XI) wherein R is hydrogen.

Compound XI wherein R is lower alkyl, lower alkenyl, phenyl, or cycloalkylloweralkyl can be prepared by reacting a portion of compound VII with an anhydride or acid halide, e.g., chloride or bromide, containing the desired R group, in the presence of an acid binding agent, e.g., an amine such as pyridine, to give a compound of Formula VIII. The compound of Formula VIII is then treated with a group I-group III metal hydride such as lithium aluminum hydride to form a compound of Formula XI.

Alternatively, a compound of Formula VIII can be hydrolyzed with an alkali metal hydroxide, e.g., sodium or potassium hydroxide, to form a compound of Formula IX, and the compound of Formula IX is then treated with a group I-group III metal hydride, such as those employed above, to form a compound of Formula XI.

Also, compounds of Formula XI wherein —CH$_2$R is a 2-alkenyl group can be made by reacting the corresponding 2-alkenyl halide, e.g., chloride or bromide, for example, allyl bromide, with the compound of Formula VII in the presence of an acid binding agent such as anhydrous potassium carbonate.

A portion of compound XI is treated with an anhydride or acid halide, containing the desired R group in an acid binding agent, e.g., an amine such as pyridine, to form a compound of Formula XII.

A portion of compound XI is reacted under Oppenauer oxidation conditions, i.e., aluminum isopropoxide and a ketone, e.g., acetone, cyclohexanone, etc., in an inert solvent to form an N-substituted-16-azaandrost-4-ene-3-one (XIII).

Compound IX is treated in an Oppenauer oxidation (as described above for converting compound V to compound VI) to give a compound of Formula X.

A portion of compound V is hydrogenated, preferably in acetic acid, to give 3β-hydroxy-5α-16-azaandrostan-17-one (XIV). The hydrogenation catalyst is a noble metal catalyst such as platinum oxide, palladium-on-charcoal, etc.

Compound XIV is reduced with a group I metal-group III metal hydride (according to the process described above for converting a compound of Formula V to a compound of Formula VII) to form 3β-hydroxy-5α-16-azaandrostane (XV).

Compound XV is then alkylated or alkenylated (according to the procedures given for converting the compound of Formula VII to a compound of Formula XI) to give a 3β-hydroxy-N-substituted 5α-16-azaandrostane (XVI).

Compound XVI is then oxidized with an oxidizing agent such as chromic acid, potassium permanganate, aluminum isopropoxide, etc., to form an N-substituted-5α-16-azaandrostan-3-one (XVII).

An alternate and preferred method of preparing compound V is given in the following reaction sequence.

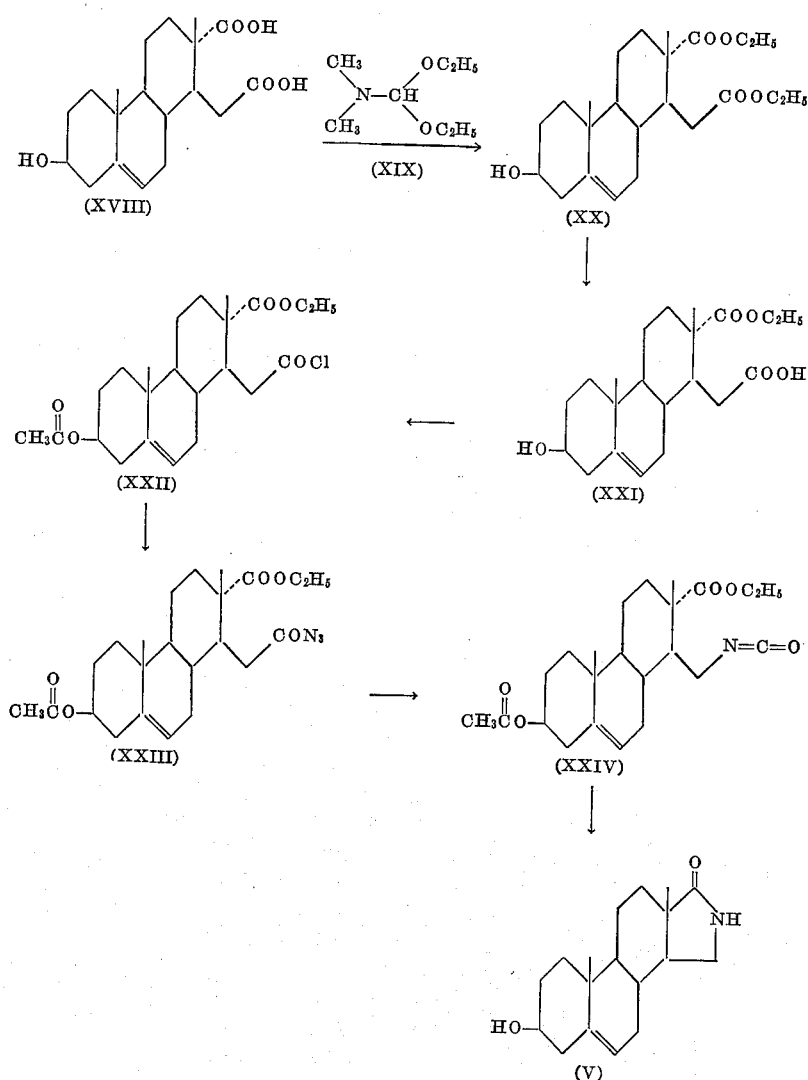

The above reaction scheme is carried out by reacting 3β-hydroxy - 16,17-secoandrost - 5-ene-16,17-dioic acid (XVIII) with the diethyl acetal of dimethylformamide (XIX) to form the diethyl ester of 3β-hydroxy-16,17-secoandrost-5-ene-16,17-dioic acid (XX). The latter is then hydrolyzed with an aqueous base, e.g., an aqueous alkali metal hydroxide such as sodium hydroxide, potassium hydroxide, etc., to form 1,2,3,4,4a,4b,5,6,7,8,10,10a-dodecahydro - 7-hydroxy - 2-carbethoxy - 2,4b-dimethyl-1-phenanthreneacetic acid (XXI). The half ester XXI is then converted into the acetate of 1,2,3,4,4a,4b,5,6,7,8,10,10a-dodecahydro - 7-hydroxy - 1-chlorocarbonylmethyl-2,4b-dimethyl - 2-phenanthrenecarboxylic acid ethyl ester (XXII) by first acetylating the 3β-hydroxy group with an acetylating agent such as acetic anhydride, acetyl chloride or bromide, etc., to form the acetate of 1,2,3,4,4a,4b,5,6,7,8,10,10a-dodecahydro - 7-hydroxy-2-carbethoxy - 2,4b-dimethyl - 1-phenanthreneacetic acid (XXI) followed by reacting the resulting acetate with an approximately equivalent quantity of a carboxylic acid halide-forming agent such as oxalyl chloride, thionyl chloride, PCl$_3$, PBr$_3$, PCl$_5$, etc. The resulting monoacid halide of Formula XXII is reacted with an alkali metal azide, e.g., sodium azide to form the acetate of 1,2,3,4,4a,4b,5,6,7,8,10,10a-dodecahydro - 7-hydroxy - 1-azidocarbonylmethyl - 2,4b-dimethyl - 2-phenanthrenecarboxylic acid ethyl ester (XXIII). This step of the reaction is preferably carried out in an organic solvent miscible with, and containing water, such as aqueous acetone, aqueous ethanol, aqueous dioxane, aqueous acetic acid, etc. However, inert solvents immiscible with, and not containing water, such as benzene, toluene, xylene, nitrobenzene, ether, etc., can also be employed. The acetate of 1,2,3,4,4a,4b,5,6,7,8,10,10a-dodecahydro - 7-hydroxy-1-azidocarbonylmethyl - 2,4b-dimethyl - 2-phenanthrenecarboxylic acid ethyl ester (XXIII) is then heated, preferably in the presence of an organic solvent, e.g., a hydrocarbon solvent, such as benzene, toluene, heptane, etc.; a halogenated, e.g., chlorinated aliphatic solvent such as chloroform; a high boiling ether (e.g., boiling at about 80° C. or above); etc., at a temperature in the range of from about 20 to about 150°, preferably in refluxing benzene, to give the acetate of 1,2,3,4,4a,4b,5,6,7,8,10,10a-dodecahydro - 7-hydroxy - 1-isocyanatomethyl-2,4b-dimethyl - 2-phenanthrenecarboxylic acid ethyl ester (XXIV). Compound XXIV is then treated with aqueous alkali, e.g., sodium hydroxide, potassium hydroxide, etc., to give 3β-hydroxy-16-azaandrost-5-en-17-one (V). This step of the reaction is preferably carried out in an organic solvent, e.g., a lower alkanol, preferably methanol, at a temperature in a range of from about 25 to about 100°, in an inert atmosphere, e.g., a nitrogen atmosphere.

The invention will be better understood by reference to the following examples which are given for illustration purposes only and are not meant to limit the invention.

EXAMPLE 1

*Preparation of the acetate of 1,2,3,4,4a,4b,5,6,7,8,10,10a-dodecahydro - 7 - hydroxy-1-isocyanatomethyl-2,4b-dimethyl-2-phenanthrenecarboxylic acid methyl ester*

To a cold (5–10°) solution of 57.0 g. of the acetate of 1,2,3,4,4a,4b,5,6,7,8,10,10a - dodecahydro - 7-hydroxy- 1 - chlorocarbonylmethyl - 2,4b-dimethyl-2-phenanthrene-carboxylic acid methyl ester in 1150 ml. of acetone was added with stirring a solution of 45.0 g. of sodium azide in 180 ml. of water. The reaction mixture was allowed to stir at 5° for an additional 15 minutes and was then diluted with 1200 ml. of water. The azide, which crystallized on scratching, was filtered, washed with cold water and dried under high vacuum overnight to give 53.2 g. of crude acetate of 1,2,3,4,4a,4b,5,6,7,8,10,10a-dodecahydro-7-hydroxy - 1 - azidocarbonylmethyl-2,4b-dimethyl-2-phenanthrenecarboxylic acid methyl ester, M.P. 51° (dec., unstable), $$\lambda_{max.}^{CHCl_3} \ 4.41, \ 4.70 \ and \ 5.82\mu$$

A solution of the above azide (53.1 g.) in 1600 ml. of benzene was heated under reflux for 1.5 hours, whereupon the evolution of gas ceased. The resulting solution was cooled, filtered through Celite (a diatomaceous silica product) and evaporated to dryness to give 51.0 g. of crude acetate of 1,2,3,4,4a,4b,5,6,7,8,10,10a-dodecahydro-7 - hydroxy - 1-isocyanatomethyl - 2,4b-dimethyl-2-phenanthrenecarboxylic acid methyl ester as a pale yellow solid, M.P. 153°–159°. Crystallization from methylene chloride-ether gave an analytical sample as a colorless solid, M.P. 161.5–163.5°, $[\alpha]_D^{28}$ −55.2° (c. 1.0 in CHCl₃), $$\lambda_{max.}^{KBr} \ 4.41 \ and \ 5.81\mu$$

EXAMPLE 2

*Preparation of 3a,3b,4,6,7,8,9,9a,9b,10,11,11a-dodecahydro - 7 - hydroxy-9a,11a-dimethyl-2H-naphth[2,1-e]isoindol-1(3H) - one-(3β-hydroxy-16-azaandrost-5-en-17-one)*

To a suspension of 52.0 g. of the crude isocyanate prepared in Example 1 in 485 ml. of methanol was added a solution of 48.7 g. of potassium hydroxide in 49 ml. of water. The resulting mixture (clear) was heated under reflux (nitrogen atmosphere) for one hour, whereupon a precipitate gradually appeared. The reaction mixture was then concentrated to about 100 ml. under reduced pressure and was then diluted with 1200 ml. of water. The resulting precipitate was filtered, washed with water and crystallized from ethanol-acetonitrile to give 21.3 g. of 3β-hydroxy-16-azaandrost-5-en-17-one, M.P. 271–273° (vac.). A further 4.04 g., M.P. 270–272° (vac.) were recovered from the mother liquors. Crystallization from chloroform-acetonitrile gave an analytical sample, M.P. 272–274° (vac.), $[\alpha]_D^{28}$ −73.9° (c. 1.0 in CHCl₃), $$\lambda_{max.}^{KBr} \ 2.98 \ and \ 5.95\mu$$

This compound is particularly useful as a hypotensive agent.

EXAMPLE 3

*Preparation of 3a,3b,4,5,7,8,9,9a,9b,10,11,11a-dodecahydro - 9a,11a - dimethyl - 2H - naphth[2,1-e]isoindol-1(3H)-7-dione (16-azaandrost-4-ene-3,17-dione)*

A solution of 5.0 g. of the lactam prepared in Example 2 in 200 ml. of dioxane, 170 ml. of toluene and 50 ml. of cyclohexanone was heated to boiling and then 30 ml. of the solvent mixture was removed by distillation. To this hot solution was rapidly added 5.0 g. aluminum isopropoxide in 50 ml. of toluene and distillation was continued with simultaneous addition of fresh toluene. After 30 minutes an additional 1.50 g. of aluminum isopropoxide was added and distillation was continued for 2 hours, a total of 300 ml. of distillate being collected.

The residue was then heated under reflux for an additional 4 hours and was allowed to stand at room temperature overnight. The reaction mixture was acidified with 400 ml. of 10 percent sulfuric acid solution and was then extracted with benzene. The organic layers were washed 3 times with 10 percent potassium carbonate solution, once with brine and dried (Na₂SO₄). The solution was evaporated to dryness on the water pump, the residual cyclohexanone being removed under high vacuum. The resulting residue was crystallized from ethyl acetate to give 2.95 g. of 3a,3b,4,5,7,8,9,9a,9b,10,11,11a-dodecahydro - 9a,11a - dimethyl - 2H-naphth[2,1-e]isoindol - 1(3H) - 7 - dione(16 - azaandrost-4-ene-3,17-dione), M.P. 238.5–240° (vac.). Crystallization from ethyl acetate gave an analytical sample, M.P. 239.5–241° (vac.), $[\alpha]_D^{26}$ +126° (c. 1.0 in CHCl₃), $$\lambda_{max.}^{C_2H_5OH} \ 239 \ m\mu \ (\epsilon \ 16{,}900); \ \lambda_{max.}^{CHCl_3} \ 2.90, \ 5.88 \ and \ 6.00\mu$$

This compound is particularly useful as a hypotensive agent.

EXAMPLE 4

*Preparation of 1,3,3a,3b,4,6,7,8,9,9a,9b,10,11,11a-tetradecahydro - 9a,11a - dimethyl-2H-naphth[2,1-e]isoindol-7-ol (3β-hydroxy-16-azaandrost-5-ene)*

To a solution of 25.0 g. of lithium aluminum hydride in 1000 ml. of boiling dioxane was rapidly added a suspension of 25.0 g. of the lactam prepared in Example 2 in 1000 ml. of dioxane. The resulting mixture was heated under reflux for 20 hours in a nitrogen atmosphere. To the cooled (ice bath) reaction mixture was slowly added 150 ml. of water and the reaction mixture was then heated under reflux for an additional 30 minutes. The hot mixture was then filtered through a bed of Celite, the latter being well washed with hot dioxane and hot chloroform. The filtrate was evaporated to dryness and the residue was crystallized from methanol-ethyl acetate to yield 18.70 g. of 1,3,3a,3b,4,6,7,8,9,9a,9b,10,11,11a-tetradecahydro - 9a,11a - dimethyl-2H-naphth[2,1-e]isoindol-7-ol (3β-hydroxy-16-azaandrost-5-ene), M.P. 234–236.5° (vac.). A further 1.61 g. (M.P. 234–236.5°, vac.) were recovered from the mother liquors. Crystallization from methanol-ethyl acetate gave an analytical sample, M.P. 235.5–237.5° (vac.), $[\alpha]_D^{25}$ −80.0° (c. 1.01 in CHCl₃), $$\lambda_{max.}^{CHCl_3} \ 2.78\mu$$

This compound is particularly useful as a hypotensive agent.

EXAMPLE 5

*Preparation of the acetate of 2-acetyl-1,3,3a,3b,4,6,7,8,9, 9a,9b,10,11,11a-tetradecahydro-9a,11a - dimethyl - 2H-naphth[2,1-e]-isoindol-7-ol (3β-hydroxy-N-acetyl - 16-azaandrost-5-ene acetate)*

To a solution of 3.0 g. of 3β-hydroxy-16-azaandrost-5-ene in 60 ml. of hot pyridine was added 12 ml. of freshly distilled acetic anhydride and the resulting solution was heated under reflux for 2 hours. The cooled reaction mixture was then poured into 400 ml. of cold water and the resulting precipitate was extracted with ether-methylene chloride (3:1). The organic layers were washed twice with N hydrochloric acid, once with 5 percent sodium bicarbonate solution and once with water. The combined organic layers were dried (Na₂SO₄) and evaporated to dryness. The residue was crystallized from acetone-hexane to give 3.43 g. of crude solid. A portion (1.0 g.) was recrystallized from acetone-hexane to give 0.928 g. of 3β-hydroxy-N-acetyl-16-azaandrost-5-ene acetate, M.P. 175–176.5° (vac.). One further crystallization from acetone-hexane gave an analytical sample, M.P. 175–176.5° (vac.), $[\alpha]_D^{25}$ −118° (c. 1.0 in CHCl₃), $$\lambda_{max.}^{CHCl_3} \ 5.79 \ and \ 6.13\mu$$

This compound is particularly useful as a hypotensive agent.

EXAMPLE 6

*Preparation of the isobutyrate of 2-isobutyryl-1,3,3a,3b, 4,6,7,8,9,9a,9b,10,11,11a - tetradecahydro - 9a,11a - dimethyl-2H-naphth[2,1-e]isoindol-7- ol (isobutyrate of 3β-hydroxy-N-isobutyryl-16-azaandrost-5-ene)*

A solution of 5.0 g. of 3β-hydroxy-16-azaandrost-5-ene in 100 ml. of pyridine and 20 ml. of isobutyric anhydride was heated under reflux for 2 hours in a nitrogen atmosphere. The reaction mixture was then cooled and poured into 500 ml. of water and the resulting mixture was extracted with ether-methylene chloride (3:1). The organic layers were washed twice with N hydrochloric acid, once with brine, 10 percent potassium carbonate solution, water, dried ($Na_2SO_4$) and evaporated to dryness. The resulting solid was crystallized from hexane to give 6.16 g. of the isobutyrate of 2-isobutyryl-1,3,3a,3b,4,6,7,8,9,9a, 9b,10,11,11a-tetradecahydro-9a,11a-dimethyl-2H - naphth [2,1-e]isoindol-7-ol (isobutyrate of 3β-hydroxy - N - isobutyryl-16-azaandrost - 5 - ene), M.P. 147–149° (vac.). Crystallization from hexane gave an analytical sample, M.P. 147.5–149° (vac.), $[\alpha]_D^{25}$ −89.2° (c. 1.0 in $C_2H_5OH$), $\lambda_{max.}^{CHCl_3}$ 5.81 and 6.17μ

EXAMPLE 7

*Preparation of 2 - acetyl - 1,3,3a,3b,4,6,7,8,9,9a,9b,10,11, 11a - tetradecahydro - 9a,11a - dimethyl - 2H - naphth- [2,1-e]isoindol-7-ol (3β-hydroxy-N-acetyl - 16 - azaandrost-5-ene)*

A solution of 4.9 g. of crude 3β-hydroxy-N-acetyl-16-azaandrost-5-ene acetate in 130 ml. of methanol and 13 ml. of 10 percent sodium hydroxide was heated under reflux for 5 minutes and was then allowed to stand at room temperature for 30 minutes. The reaction mixture was then evaporated to about 20 ml. and the residue was diluted with 400 ml. of water. The resulting precipitate was filtered, washed with water and dried to give 3.98 g. of crude 3β-hydroxy-N-acetyl-16-azaandrost-5-ene, M.P. 189–192° (vac.). Crystallization from ethyl acetate gave an analytical sample, M.P. 192–194° (vac.), $[\alpha]_D^{26}$ −112.4° (c. 1.0 in $CHCl_3$), $\lambda_{max.}^{CHCl_3}$ 2.77 and 6.15μ

This compound is particularly useful as a hypotensive agent.

EXAMPLE 8

*Preparation of 2-butyryl-1,3,3a,3b,4,6,7,8,9,9a,9b,10,11, 11a-tetradecahydro-9a,11a-dimethyl-2H-naphth[2,1 - e] isoindol-7-ol (3β-hydroxy-N-butyryl-16-azaandrost - 5-ene)*

A solution of 3.06 g. of 3β-hydroxy-16-azaandrost-5-ene in 45 ml. of pyridine and 10 ml. of n-butyric anhydride was heated under reflux for 2 hours in a nitrogen atmosphere. The cooled reaction mixture was then poured into 300 ml. of cold water and the resulting mixture was extracted with ether-methylene chloride (3:1). The organic layers were washed twice with N hydrochloric acid, once with brine, 10 percent potassium carbonate solution, water, and were then dried ($Na_2SO_4$) and evaporated to dryness.

To the resulting residue in 100 ml. of methanol was added 10 ml. of 3 N sodium hydroxide solution and the reaction mixture was allowed to stand at room temperature overnight. The solvents were then removed under reduced pressure and the residue was diluted with 70 ml. of water. The resulting precipitate was filtered, dried and crystallized from ethyl acetate to give 2.92 g. (76 percent) of crude 3β-hydroxy-N-butyryl-16-azaandrost-5-ene, M.P. 142–147° (vac.). The product was dissolved in benzene and was filtered through a short column of Florisil (a synthetic magnesium silicate adsorbent). The residue was crystallized twice from methylene chloride-ether to give an analytical sample, M.P. 146–148.5° (vac.), $[\alpha]_D^{25}$ −97.8° (c. 0.5 in $C_2H_5OH$), $\lambda_{max.}^{CHCl_3}$ 2.77 and 6.15μ

EXAMPLE 9

*Preparation of 2-isobutyryl - 1,3,3a,3b,4,6,7,8,9,9a,9b,10, 11,11a-tetradecahydro-9a,11a - dimethyl- 2H - naphth- [2,1-e]isoindol-7-ol (3β-hydroxy - N - isobutyryl - 16-azaandrost-5-ene)*

To a solution of 5.54 g. of the isobutyrate of 3β-hydroxy-N-isobutyryl-16-azaandrost - 5 - ene in 120 ml. of methanol was added 11.0 ml. of 3 N sodium hydroxide solution and the resulting mixture was allowed to stand at room temperature overnight. The solvents were then removed under reduced pressure and the residue was diluted with 100 ml. of water. The resulting precipitate was filtered, washed with water and dried. Crystallization from ethyl acetate gave 4.17 g. of 3β-hydroxy-N-isobutyryl-16-azaandrost-5-ene, M.P. 208–209° (vac.). A further 0.18 g. (M.P. 205–207.5° vac.) were recovered from the mother liquors (total yield, 94.5 percent). Crystallization from ethyl acetate gave an analytical sample, M.P. 208.5–210° (vac.), $[\alpha]_D^{25}$ −97.3° (c. 1.0 in $C_2H_5OH$), $\lambda_{max.}^{CHCl_3}$ 2.77 and 6.16μ

This compound is particularly useful as an antidepressant agent.

EXAMPLE 10

*Preparation of 1,3,3a,3b,4,6,7,8,9,9a,9b,10,11,11a-tetradecahydro - 2,9a,11a-trimethyl-2H-naphth[2,1-e]isoindol-7-ol (3β-hydroxy-N-methyl-16-azaandrost-5-ene)*

A solution of 5.50 g. of 3β-hydroxy-16-azaandrost-5-ene in 56 ml. of 90 percent aqueous formic acid and 42 ml. of 36 percent aqueous formaldehyde was heated under reflux for 2.5 hours (nitrogen atmosphere). An additional 28 ml. of formaldehyde solution was then added and the reaction mixture was again heated under reflux for 2.5 hours. The reaction mixture was then evaporated to near dryness under reduced pressure. The residue was taken up in 150 ml. of 10 percent methanolic potassium hydroxide solution and the resulting mixture was heated under reflux for 10 minutes. The solvents were then removed under reduced pressure and the residue was diluted with 200 ml. of water. The mixture was extracted three times with ether-methylene chloride (3:1) and the organic layers were washed once with water. The combined organic layers were dried ($Na_2SO_4$) and evaporated to dryness. The residue was crystallized from acetonitrile to give 4.41 g. of 3β-hydroxy-N-methyl-16-azaandrost-5-ene, M.P. 165–167° (vac.). Crystallization from acetonitrile gave an analytical sample, M.P. 168–169.5° (vac.), $[\alpha]_D^{28}$ −108.8° (c. 1.0 in $CHCl_3$), $\lambda_{max.}^{KBr}$ 3.19μ

This compound is particularly useful as a hypotensive and an antidepressant agent.

EXAMPLE 11

*Preparation of 2-butyl-1,3,3a,3b,4,6,7,8,9,9a,9b,10,11-11a-tetradecahydro - 9a,11a - dimethyl-2H-naphth[2,1-e] isoindol-7-ol (3β-hydroxy-N-butyl-16-azaandrost-5-ene)*

A solution of 4.0 g. of 3β-hydroxy-16-azaandrost-5-ene in 60 ml. of dry pyridine and 14.5 ml. of n-butyric anhydride was heated under reflux (nitrogen atmosphere) for 2 hours. The reaction mixture was then poured into 400 ml. of water and the resulting mixture was extracted with ether-methylene chloride (3:1). The organic layers were washed twice with N hydrochloric acid, once with brine, 10 percent potassium carbonate solution, water and were then dried ($Na_2SO_4$). The resulting solution was evaporated to dryness and was then dissolved in benzene-ethyl acetate and passed through a short column of silicic acid.

Evaporation of the eluates gave an oil which crystallized slowly on standing.

To a boiling solution of 6.91 g. of lithium aluminum hydride in 270 ml. of dry dioxane was rapidly added a solution of the above oil in 270 ml. of dry dioxane and the resulting mixture was heated under reflux for 3 hours and was then allowed to stand at room temperature overnight. To the cooled reaction mixture was slowly added 42 ml. of water and the mixture was again heated under reflux for 30 minutes. The resulting hot mixture was filtered through a bed of Celite, the latter being well washed with hot dioxane. The filtrate was evaporated to dryness in vacuo and the residue was dissolved in ether-methylene chloride (3:1). The organic layers were washed three times with 500 ml. of N hydrochloric acid. The combined acidic layers were made basic with 3 N sodium hydroxide solution. The resulting mixture was extracted with ether-methylene chloride (3:1) and the organic layers were washed with water, dried ($Na_2SO_4$) and evaporated in vacuo. The resulting solid was crystallized from acetonitrile to give 3.31 g. of 3β-hydroxy-N-butyl-16-azaandrost-5-ene, M.P. 115–116° (vac.). Further crystallization from acetonitrile gave an analytical sample, M.P. 115.5–116.5° (vac.), $[\alpha]_D^{25}$ −73.9° (c. 1.0 in $C_2H_5OH$), $$\lambda_{max.}^{CHCl_3} 2.77\mu$$

This compound is particularly useful as an antidepressant agent.

EXAMPLE 12

*Preparation of 2-isobutyl-1,3,3a,3b,4,6,7,8,9,9a,9b,10,11, 11a - tetradecahydro - 9a,11a-dimethyl-2H-naphth[2,1-e]isoindol-7-ol (3β-hydroxy-N-isobutyl-16-azaandrost-5-ene)*

To a boiling solution of 2.29 g. of lithium aluminum hydride in 90 ml. of dry dioxane was rapidly added a solution of 2.29 g. of 3β-hydroxy-N-isobutyryl-16-azaandrost-5-ene in 90 ml. of dry dioxane and the resulting mixture was heated under reflux for 18 hours. To the cooled reaction mixture was slowly added 13.9 ml. of water and the resulting mixture was again heated under reflux for 30 minutes. It was then filtered hot through Celite and the filtrate was evaporated to dryness. The resulting solid was taken up in ether-methylene chloride (3:1) and was then separated into neutral and basic fractions with N hydrochloric acid. The combined hydrochloric acid layers (300 ml.) were made basic with 3 N sodium hydroxide. The resulting mixture was extracted with ethermethylene chloride (3:1), and the organic layers were washed with water, dried ($Na_2SO_4$) and evaporated to dryness. The residue was crystallized from acetonitrile to give 1.45 g. (66 percent) of 3β-hydroxy-N-isobutyl-16-azaandrost-5-ene, M.P. 127.5–129° (vac.). Crystallization from acetonitrile gave an analytical sample, M.P. 128.5–129° (vac.), $[\alpha]_D^{25}$ −80.4° (c. 0.5 in $C_2H_5OH$), $$\lambda_{max.}^{CHCl_3} 2.77\mu$$

This compound is particularly useful as an antidepressant agent.

EXAMPLE 13

*Preparation of 2-cyclopropylmethyl-1,3,3a,3b,4,6,7,8,9,9a, 9b,10,11,11a - tetradecahydro - 9a,1a - dimethyl-2H-napth[2,1-e]isoindol-7-ol (3β-hydroxy-N-cyclopropylmethyl-6-azaandrost-5-ene)*

To a solution of 1.5 g. of 3β-hydroxy-16-azaandrost-5-ene in 25 ml. of chloroform and 7 ml. of triethylamine was added a solution of 1.71 g. of cyclopropylcarbonyl chloride in 5 ml. of chloroform and the resulting mixture was heated under reflux with stirring for 1 hour. The chloroform solution was washed three times with 3 N hydrochloric acid and then diluted with twice its volume of ether. The resulting mixture was washed twice with 10 percent sodium carbonate solution, once with saturated brine and dried ($Na_2SO_4$). The organic layers were then combined, filtered through Celite, and evaporated to dryness. The residue was dissolved in chloroform and passed through a short column of Florisil. Evaporation of the eluate gave 2.9 g. of light brown oil.

The light brown oil was added to a solution of 2.9 g. of lithium aluminum hydride in 100 ml. of dioxane, and the resulting mixture was heated under reflux for 3 hours. To the cooled reaction mixture was slowly added 17 ml. of water and the mixture was again heated under reflux for 30 minutes. The resulting hot mixture was filtered through a bed of Celite, the latter being well washed with hot dioxane. The filtrate was evaporated to dryness and the residue dissolved in ether-methylene chloride (3:1). The organic solution was then extracted three times with N hydrochloric acid. The combined acidic layers were then cooled and made basic by the addition of 200 ml. of 3 N sodium hydroxide solution. The mixture was extracted with ether-methylene chloride (3:1) which was then washed with water, dried ($Na_2SO_4$) and evaporated. The residue was crystallized from ethyl acetate (charcoal) to give 3β-hydroxy-N-cyclopropylmethyl-16-azaandrost-5-ene, melting point 150–151.5° (vac.). A further crop of product (melting point 149.5–151° vac.) was recovered from the mother liquors. Crystallization from ethyl acetate gave an analytical sample, melting point 150.5–152° (vac.). $[\alpha]_D^{25}$ −72.4° (c. 0.5 in $C_2H_5OH$), $$\lambda_{max.}^{CHCl_3} 2.77\mu$$

This compound is particularly useful as an antidepressant agent.

EXAMPLE 14

*Preparation of 2-allyl-1,3,3a,3b,4,6,7,8,9,9a,9b,10,11,11a-tetradecahydro - 9a,11a - dimethyl - 2H - naphth[2,1-e] isoindol-7-ol (3β-hydroxy-N-allyl-16-azaandrost-5-ene)*

To a stirred solution of 275 mg. of 3β-hydroxy-16-azaandrost-5-ene in 3 ml. of methanol was added 0.140 g. of allyl bromide and 0.138 g. of anhydrous potassium carbonate. The resulting mixture was heated under reflux overnight (nitrogen atmosphere). The cooled reaction mixture was concentrated under reduced pressure and the residue was diluted with 30 ml. of N sodium hydroxide solution. The resulting mixture was extracted with ether-methylene chloride (3:1) and the organic layers were washed with water, dried ($Na_2SO_4$) and evaporated to dryness. The residue was dissolved in benzene and passed through a short column of Florisil. Evaporation of the benzene and chloroform eluates gave 48 mg. of crude product. Crystallization from acetonitrile gave 26 mg. of 3β-hydroxy-N-allyl-16-azaandrost-5-ene, M.P. 116–117° (vac.), $$\lambda_{max.}^{KBr} 3.09\mu \text{ (broad)}.$$

EXAMPLE 15

*Preparation of the acetate of 1,3,3a,3b,4,6,7,8,9,9a,9b,10, 11,11a-tetradecahydro-2,9a,11a-trimethyl - 2H - naphth [2,1-e]isoindol-7-ol (3β-hydroxy-N-methyl-16 - azaandrost-5-ene acetate)*

A solution of 0.50 g. of 3β-hydroxy-N-methyl-16-azaandrost-5-eene in 10 ml. of pyridine and 3.0 ml. of acetic anhydride was heated under reflux for 10 minutes. The cooled reaction mixture was poured into 125 ml. of 10 percent potassium carbonate solution and the resulting mixture was extracted with ether-methylene chloride (3:1). The organic layers were washed with water, dried ($Na_2SO_4$) and were then evaporated to dryness. The residue was taken up in benzene and filtered through a short column of Florisil. Evaporation of the benzene eluates gave a residue which was crystallized from acetonitrile to afford 237 mg. (41.5 percent) of 3β-hydroxy-N-methyl-16-azaandrost-5-ene acetate, M.P. 111–113° (vac.). Crystallization from acetonitrile gave an analytical sample, M.P. 113.5–115° (vac.), $[\alpha]_D^{27}$ −105° (c. 1.0 in CHCl₃), $$\lambda_{max.}^{CHCl_3} \ 5.79\mu$$

This compound is particularly useful as an antidepressant agent.

EXAMPLE 16

*Preparation of the propionate of 1,3,3a,3b,4,6,7,8,9,9a,9b, 10,11,11a - tetradecahydro - 2,9a,11a - trimethyl - 2H-naphth[2,1-e]-isoindol-7-ol (3β-hydroxy-N-methyl - 16-azaandrost-5-ene propionate)*

A solution of 0.50 g. of 3β-hydroxy-N-methyl-16-azaandrost-5-ene in 10 ml. of pyridine and 3.0 ml. of acetic anhydride was heated under reflux for 30 minutes. The cooled reaction mixture was then poured into 125 ml. of cold 10 percent sodium carbonate solution. The resulting mixture was extracted with ether-methylene chloride (3:1) and the organic layers were washed with water and dried (Na₂SO₄). The solvents were then evaporated and the residue was dissolved in benzene and was filtered through a short column of Florisil. Evaporation of the benzene eluates gave 240 mg. (40 percent) of the propionate of 1,3,3a,3b,4,6,7,8,9,9a,9b,10,11,11a-tetradecahydro-2,9a,11a-trimethyl-2H-naphth[2,1-e]isoindol-7-ol (3β-hydroxy-N-methyl-16-azaandrost-5-ene propionate) as a polymorphic mixture, M.P. 98–108° (vac.). Further crystallization from acetonitrile gave the analytical sample, M.P. 97–100° (vac.), solidified, remelted at 107–108° (vac.), $[\alpha]_D^{27}$ −98.6° (c. 0.7 in CHCl₃), $$\lambda_{max.}^{CHCl_3} \ 5.79\mu$$

This compound is particularly useful as an antidepressant agent.

EXAMPLE 17

*Preparation of 2-acetyl-1,3,3a,3b,4,5,9,9a,9b,10,11,11a-dodecahydro - 9a,11a - dimethyl - 2H - naphth[2,1-e]isoindol-7(8H)-one (N - acetyl-16-azaandrost-4-en-3-one)*

A solution of 4.31 g. of 3β-hydroxy-N-acetyl-16-azaandrost-5-ene in 350 ml. of toluene and 43 ml. of cyclohexanone was heated to boiling and 30 ml. of solvents were removed by distillation. To this hot solution was rapidly added 4.3 g. of aluminum isopropoxide in 43 ml. of toluene and distillation was continued. After 1 hour an additional 1.25 g. of aluminum isopropoxide was added and distillation was continued for 30 minutes, a total of 85 ml. of distillate being collected. The reaction mixture was then filtered from the insoluble aluminum salts, and the filtrate was steam distilled. The residue was extracted with ether-methylene chloride (3:1) and the organic layers were washed with water, dried (Na₂SO₄) and evaporated. The resulting oil was dissolved in benzene and filtered through a short column of Florisil. Evaporation of the eluates gave an oil which crystallized from methylene chloride ether-hexane to give 1.95 g. of N-acetyl-16-azaandrost-4-en-3-one, M.P. 131–133° (vac.). Further crystallization from the same solvents system gave an analytical sample, M.P. 133–135° (vac.), $$[\alpha]_D^{28} + 16.8°$$

(c. 1.1 in CHCl₃), $\lambda_{max.}^{C_2H_5OH}$ 240 m$\mu$ ($\epsilon$ 17,150); $\lambda_{max.}^{CHCl_3}$ 6.00 and 6.15$\mu$ This compound is particularly useful as an antidepressant agent.

EXAMPLE 18

*Preparation of 2-butyryl-1,3,3a,3b,4,5,9,9a,9b,10,11,11a-dodecahydro - 9a,11a - dimethyl - 2H-naphth[2,1-e]isoindol-7(8H)-one (N-butyryl-16-azaandrost-4-en-3-one)*

A solution of 1.29 g. of 3β-hydroxy-N-butyryl-16-azaandrost-5-ene in 98 ml. of toluene and 13.5 ml. of cyclohexanone was heated to boiling and 10 ml. of solvents were removed by distillation. To this hot solution was rapidly added a solution of 1.35 g. of aluminum isopropoxide in 13.5 ml. of toluene and distillation was continued. After 1 hour an additional 0.35 g. of aluminum isopropoxide was added and distillation was continued for 90 minutes, a total of 50 ml. of distillate being collected. The hot reaction mixture was then filtered and the filtrate was steam distilled. The residue was extracted with ether-methylene chloride (3:1), washed with water, dried (Na₂SO₄) and evaporated to dryness under reduced pressure. The resulting oil was dissolved in benzene and filtered through a short column of Florisil. The product was crystallized from ether-hexane to give 0.51 g. of N-butyryl-16-azaandrost-4-en-3-one, M.P. 127.5–130.5° (vac., transition point at 80–90°). Further crystallization from ether-hexane gave an analytical sample, M.P. 128–131° (vac.), $[\alpha]_D^{25}$ +2.6° (c. 0.5 in C₂H₅OH), $\lambda_{max.}^{C_2H_5OH}$ 240 m$\mu$ ($\epsilon$ 19,000); $\lambda_{max.}^{CHCl_3}$ 5.99 and 6.14$\mu$ This compound is particularly useful as an antidepressant agent.

EXAMPLE 19

*Preparation of 2-isobutyryl-1,3,3a,3b,4,5,9,9a,9b,10,11, 11a - dodecahydro - 9a,11a-dimethyl-2H-naphth[2,1-e]isoindol - 7(8H)-one (N-isobutyryl-16-azaandrost-4-en-3-one)*

A solution of 1.32 g. of 3β-hydroxy-N-isobutyryl-16-azaandrost-5-ene in 100 ml. of toluene and 13.8 ml. of cyclohexanone was heated to boiling and 10 ml. of the solvent was removed by distillation. To this hot solution was rapidly added 1.38 g. of aluminum isopropoxide in 14 ml. of toluene and distillation was continued. After 1 hour, an additional 0.35 g. of aluminum isopropoxide was added and distillation was continued for an additional 1.5 hours, a total of 50 ml. of distillate being collected. The hot reaction mixture was filtered and the filtrate was steam distilled. The residue was taken up in methylene chloride, washed with water, dried (Na₂SO₄) and evaporated under reduced pressure. The resulting solid was crystallized from methylene chloride-ether to give 0.832 g. of N-isobutyryl-6-azaandrost-4-en-3-one, M.P. 216–218° (vac.). Further crystallization from the same solvent system gave an analytical sample, M.P. 216.5–218° (vac.), $[\alpha]_D^{25}$ +2.8° (c. 1.0 in C₂H₅OH), $\lambda_{max.}^{C_2H_5OH}$ 240 m$\mu$ ($\epsilon$ 17,900); $\lambda_{max.}^{CHCl_3}$ 5.99 and 6.15$\mu$ This compound is particularly useful as a hypotensive agent.

EXAMPLE 20

*Preparation of 1,3,3a,3b,4,5,9,9a,9b,10,11,11a-dodecahydro-2,9a,11a-trimethyl - 2H - naphth[2,1-e]isoindol-7 (8H)-one (N-methyl-16-azaandrost-4-en-3-one)*

A solution of 3.0 g. of 3β-hydroxy-N-methyl-16-azaandrost-5-ene in 240 ml. of toluene and 30 ml. of cyclohexanone was heated to boiling and 25 ml. of the solvent was removed by distillation. To this hot solution was then rapidly added 3.0 g. of aluminum isopropoxide in 30 ml. of toluene and distillation was continued with simultaneous addition of fresh toluene. After 1 hour an additional 0.90 g. of aluminum isopropoxide was added and distillation was continued for 30 minutes, a total of 100 ml. of distillate being collected. The reaction mixture was cooled, filtered and the filtrate was steam distilled. The residue was taken up in methylene chloride, washed with water, dried (Na₂SO₄) and evaporated under reduced pressure. The resulting solid was dissolved in 100 ml. of ethyl acetate and was treated with anhydrous hydrogen chloride. The resulting solid was removed by filtration to give 2.78 g. of crude hydrochloride, M.P. 285–287° (vac.).

The latter compound was dissolved in water and was treated with 100 ml. of N potassium hydroxide solution. The liberated base was isolated with ether-methylene chloride (3:1) to give 2.6 g. of crude product, M.P. 107–114° (vac.). Crystallization from aqueous methanol gave 1.56 g. (52 percent) of N-methyl-16-azaandrost-4-en-3-one, M.P. 110.5–113° (vac.). Crystallization from aqueous methanol gave an analytical sample, M.P. 111–113° (vac.), $[\alpha]_D^{28} +60.4°$ (c. 1.0 in $CHCl_3$), $\lambda_{max.}^{C_2H_5OH}$ 240 m$\mu$ ($\epsilon$ 17,000); $\lambda_{max.}^{CHCl_3}$ 6.01$\mu$ This compound is particularly useful as a hypotensive and an antidepressant agent.

EXAMPLE 21

*Preparation of the hydrochloride of 2-butyl-1,3,3a,3b,4,5, 9,9a,9b,10,11,11a - dodecahydro - 9a,11a - dimethyl-2H-naphth[2,1-e]isoindol - 7 - (8H) - one (N-butyl-16-azaandrost-4-en-3-one hydrochloride)*

A solution of 1.50 g. of 3$\beta$-hydroxy-N-butyl-16-azaandrost-5-ene in 114 ml. of toluene and 15.0 ml. of cyclohexanone was heated to boiling and 15 ml. of solvent was removed by distillation. To this hot solution was then rapidly added 1.5 g. of aluminum isopropoxide in 15 ml. of toluene and distillation was continued. After 1 hour, an additional 0.38 g. of aluminum isopropoxide was added and distillation was continued for an additional 1.5 hours, a total of 60 ml. of distillate being collected. The reaction mixture was then filtered and the filtrate was steam distilled. The residue was taken up in methylene chloride and was washed three times with N hydrochloric acid. The organic layer was dried ($Na_2SO_4$) and evaporated to dryness. The residue was crystallized from ethyl acetate to give 0.86 g. of the hydrochloride of 2-butyl-1,3,3a,3b, 4,5,9,9a,9b,10,11,11a - dodecahydro - 9a,11a - dimethyl-2H - naphth[2,1-e] - isoindol - 7 - (8H)-one (N-butyl-16-azaandrost - 4 - en-3-one hydrochloride), M.P. 265–268° (vac.). A further 0.15 g. (M.P. 264–266° vac.) were recovered from the mother liquors. Crystallization from methylene chloride ether gave an analytical sample, M.P. 264–266.5° (vac.), $[\alpha]_D^{26} +52.6°$ (c. 1.0 in $CHCl_3$), $\lambda_{max.}^{C_2H_5OH}$ 240 m$\mu$ ($\epsilon$ 16,600);

$\lambda_{max.}^{CHCl_3}$ 4.11 (broad) and 6.00$\mu$

This compound is particularly useful as a hypotensive and an antidepressant agent.

EXAMPLE 22

*Preparation of the hydrochloride of 2-isobutyl-1,3,3a,3b, 4,5,9,9a,9b,10,11,11a - dodecahydro - 9a,11a - dimethyl-2H - naphth[2,1-e] - isoindol - 7(8H)-one (N-isobutyl-16-azaandrost-4-en-3-one hydrochloride)*

A solution of 800 mg. of 3$\beta$-hydroxy-N-isobutyl-16-azaandrost-5-ene in 61 ml. of toluene and 8.0 ml. of cyclohexanone was heated to boiling and 5 ml. of solvent was removed by distillation. To this hot solution was rapidly added 0.800 g. of aluminum isopropoxide and distillation was continued. After 1 hour, an additional 0.22 g. of aluminum isopropoxide was added and distillation was continued for an additional 1.5 hours, a total of 40 ml. of distillate being collected. The reaction mixture was filtered and the filtrate was steam distilled. The residue was taken up in methylene chloride and was washed two times with N hydrochloric acid. The organic layers were then dried ($Na_2SO_4$) and evaporated to dryness. The residue was crystallized from methylene chloride-ether to give 303 mg. (38 percent) of N-isobutyl-16-azaandrost-4-en-3-one hydrochloride, M.P. 277–280° (vac.). Further crystallization from the same solvent system gave an analytical sample, M.P. 279–282° (vac.), $[\alpha]_D^{25} +58.0°$ (c. 0.5 in $CHCl_3$), $\lambda_{max.}^{C_2H_5OH}$ 240 m$\mu$ ($\epsilon$ 16,800);

$\lambda_{max.}^{CHCl_3}$ 4.10 (broad) and 6.00$\mu$

This compound is particularly useful as a hypotensive and an antidepressant agent.

EXAMPLE 23

*Preparation of 3a,3b,4,5,5a,6,7,8,9,9a,9b,10,11a-tetradecahydro - 7 - hydroxy-9a,11a-dimethyl-2H-naphth[2,1-e] isoindol - 1(3H)-one (3$\beta$-hydroxy-5$\alpha$-16-azaandrostan-17-one)*

A solution of 10.0 g. of 3$\beta$-hydroxy-16-azaandrost-5-en-17-one in 400 ml. of glacial acetic acid was hydrogenated over 1.0 g. of platinum oxide ($t=23°$, $p=765$ mm.). After the absorption of 871 ml. of hydrogen (theory for 1.0 mole$=836$ ml.) the rate of hydrogenation had markedly decreased and the reaction was stopped. The catalyst was removed by filtration and the filtrate was evaporated under reduced pressure to give an oil which slowly solidified. Crystallization from methanol-ethyl acetate gave 9.68 g. of 3$\beta$-hydroxy-5$\alpha$-16-azaandrostan-17-one, M.P. 256–258° (vac.). Crystallization from methanol-ethyl acetate gave an analytical sample, M.P. 255–257° (vac.), $[\alpha]_D^{27} +6.1°$ (c. 0.5 in $CHCl_3$)

$\lambda_{max.}^{CHCl_3}$ 2.76, 2.91 and 5.92$\mu$

This compound is particularly useful as a hypotensive and an antidepressant agent.

EXAMPLE 24

*Preparation of hexadecahydro - 9a,11a - dimethyl - 2H-naphth[2,1-e]-isoindol - 7 - ol (3$\beta$-hydroxy-5$\alpha$-16-azaandrostane)*

To a boiling solution of 18.1 g. of lithium aluminum hydride in 1200 ml. of dioxane was rapidly added a suspension of 18.1 g. of 3$\beta$-hydroxy-5$\alpha$-16-azaandrostan-17-one in 600 ml. of dioxane. The resulting mixture was heated under reflux in a nitrogen atmosphere for 22 hours. To the cooled reaction mixture was slowly added 108 ml. of water and the mixture was again heated under reflux for 30 minutes. The hot reaction mixture was then filtered through Celite and the filtrate was evaporated to dryness. The resulting solid was crystallized from methanol-ethyl acetate to give 13.62 g. (79 percent) of 3$\beta$-hydroxy-5$\alpha$-16-azaandrostane, M.P. 234.5–236.5° (vac.). Crystallization from the same solvent combination gave an analytical sample, M.P. 234–236° (vac.), $[\alpha]_D^{27} +4.8°$ (c. 0.5 in $C_2H_5OH$), $\lambda_{max.}^{CHCl_3}$ 2.76$\mu$ This compound is particularly useful as a hypotensive and an antidepressant agent.

EXAMPLE 25

*Preparation of hexadecahydro - 2,9a,11a - trimethyl - 2H-naphth[2,1 - e]isoindol-7-ol (3$\beta$-hydroxy-N-methyl-5$\alpha$-16-azaandrostane)*

A solution of 11.8 g. of 3$\beta$-hydroxy-5$\alpha$-16-azaandrostane in 120 ml. of 90 percent aqueous formic acid and 90.0 ml. of 36 percent aqueous formaldehyde solution was heated under reflux for 2.5 hours. An additional 60 ml. of formaldehyde solution was then added and the reaction mixture was again heated under reflux for 30 minutes. The reaction mixture was then evaporated to near dryness and the residue was heated under reflux for 15 minutes with 150 ml. of 10 percent sodium hydroxide solution. The mixture was then evaporated to dryness and was diluted with 500 ml. of concentrated ammonium hydroxide. The resulting precipitate was filtered, washed with water and dried. The crude product was dissolved in chloroform and filtered through a short column of Florisil. Crystallization from chloroform - acetonitrile gave 4.75 g. (38 percent) of 3$\beta$-hydroxy-N-methyl-5$\alpha$-16-azaandrostane, M.P. 158–160.5°. Crystallization from chloroform-acetonitrile gave an analytical sample, M.P. 160.5–162.5° (vac.), $[\alpha]_D^{27}$ —24.5° (c. 0.5 in $C_2H_5OH$), $$\lambda_{max.}^{CHCl_3} \ 2.76\mu$$

This compound is particularly useful as a hypotensive and an antidepressant agent.

EXAMPLE 26

*Preparation of 1,3,3a,3b,4,5,5a,8,9,9a,9b,10,11,11a - tetradecahydro - 2,9a,11a - trimethyl - 2H - naphth[2,1 - e] isoindol - 7(6H) - one (N-methyl-5α-16-azaandrostan-3-one)*

To a solution of 4.25 g. of 3β-hydroxy-N-methyl-5α-16-azaandrostane in 175 ml. of glacial acetic acid was slowly added a solution of 2.20 g. of chromic anhydride in 45 ml. of glacial acetic acid and 22 ml. of water. The resulting reaction mixture was then allowed to stir at room temperature for 5.5 hours. At the end of this time, 8 ml. of isopropanol was added and the reaction mixture was then poured over chipped ice and was made alkaline with 500 ml. of concentrated ammonium hydroxide. The resulting mixture was extracted with ether-methylene chloride (3:1), and the organic layers were washed with water, brine and dried ($Na_2SO_4$). Removal of the solvents under reduced pressure gave the product as an oil which slowly solidified. The compound was filtered through a short column of Florisil and the benzene and chloroform eluates were evaporated to dryness. The residue was crystallized twice from aqueous acetone to give 2.52 g. (59.5 percent) of N-methyl-5α-16-azaandrostan-3-one, M.P. 106.5–108.5° (vac.). Crystallization from aqueous acetone gave an analytical sample, M.P. 107.5–109° (vac.), $[\alpha]_D^{27}$ —6° (c. 0.50 in ethanol), $$\lambda_{max.}^{CHCl_3} \ 5.85\mu$$

This compound is particularly useful as a hypotensive and an antidepressant agent.

EXAMPLE 27

*Preparation of the acetate of 2-isobutyl-1,3,3a,3b,4,6,7,8,9,9a,9b,10,11,11a - tetradecahydro - 9a,11a - dimethyl-2H-naphth[2,1-e]isoindol-7-ol (acetate of 3β-hydroxy-N-isobutyl-16-azaandrost-5-ene)*

A solution of 1.0 g. of 3β-hydroxy-N-isobutyl-16-azaandrost-5-ene in 20 ml. of dry pyridine and 6.0 ml. of acetic anhydride was allowed to stand at room temperature overnight and was then poured into 250 ml. of cold 10 percent potassium carbonate solution. The resulting mixture was extracted with ether-methylene chloride (3:1) and the organic layers were washed three times with water, dried ($Na_2SO_4$) and evaporated to dryness. The resulting yellow oil was dissolved in benzene and was filtered through a short column of Florisil. Evaporation of the benzene eluates gave a residue which was crystallized from acetonitrile to give the acetate of 3β-hydroxy-N-isobutyl-16 - azaandrost - 5 - ene, melting point 134–136° (vac.). Crystallization from acetonitrile gave an analytical sample, melting point 134–136° (vac.). $[\alpha]_D^{25}$ —93.9° (c. 0.5 in $CHCl_3$), $$\lambda_{max.}^{CHCl_3} \ 5.80 \text{ and } 7.98\mu$$

EXAMPLE 28

*Preparation of the propionate of 2-isobutyl-1,3,3a,3b,4,6,7,8,9,9a,9b,10,11,11a - tetradecahydro - 9a,11a - dimethyl-2H-naphth[2,1-e]isoindol-7-ol (propionate of 3β-hydroxy-N-isobutyl-16-azaandrost-5-ene)*

A solution of 1.0 g. of 3β-hydroxy-N-isobutyl-16-azaandrost-5-ene in 20 ml. of dry pyridine and 6.0 ml. of propionic anhydride was allowed to stand at room temperature overnight and was then poured into 250 ml. of cold 10 percent potassium carbonate solution. The resulting mixture was extracted with ether-methylene chloride (3:1) and the organic layers were washed three times with water, dried ($Na_2SO_4$) and evaporated to dryness. The resulting yellow oil was dissolved in benzene and was filtered through a short column of Florisil. Evaporation of the benzene eluates gave a residue which was crystallized from acetonitrile to give the propionate of 3β-hydroxy-N-isobutyl-16-azaandrost-5-ene, melting point 117–120° (vac.). Further crystallization from acetonitrile gave an analytical sample, melting point 118–119.6° (vac.). $[\alpha]_D^{25}$ —91.6° (c. 1.0 in $CHCl_3$), $$\lambda_{max.}^{CHCl_3} \ 5.80 \text{ and } 8.33\mu$$

EXAMPLE 29

*Preparation of the benzoate of 2-isobutyl-1,3,3a,3b,4,6,7,8,9,9a,9b,10,11,11a - tetradecahydro - 9a,11a - dimethyl-2H-naphth[2,1-e]isoindol-7-ol (benzoate of 3β-hydroxy-N-isobutyl-16-azaandrost-5-ene)*

A solution of 0.25 g. of benzoyl chloride in 5.5 ml. of dry pyridine was added to 0.55 g. of 3β-hydroxy-N-isobutyl-16-azaandrost-5-ene and the resulting mixture was heated on the steam bath (nitrogen atmosphere) for 2 hours. The reaction mixture was then cooled, diluted with 100 ml. of water and extracted with ether-methylene chloride (3:1). The organic layers were washed twice with 10 percent sodium carbonate solution and once with saturated sodium chloride solution. The combined organic layers were dried ($Na_2SO_4$) and evaporated to dryness. The resulting yellow oil was dissolved in benzene and passed through a short column of Florisil. Evaporation of the eluates gave a residue which was crystallized from chloroform-acetonitrile to give the benzoate of 3β-hydroxy - N - isobutyl-16-azaandrost-5-ene, melting point 131–133° (vac.). Two further crystallizations from chloroform-acetonitrile and finally crystallized from ethanol gave an analytical sample, melting point 132.5–134.5° (vac.). $[\alpha]_D^{25}$ —53.6° (c. 0.5 in $CHCl_3$), $$\lambda_{max.}^{CHCl_3} \ 5.85 \text{ and } 7.85\mu$$

EXAMPLE 30

*Preparation of the diethyl ester of 3-hydroxy-16,17-secoandrost-5-ene-16,17-dioic acid*

In a 250 ml. 3-neck flask fitted with a stirrer, condenser and calcium chloride tube was added 10.0 g. of 3β-hydroxy - 16,17 - secoandrost-5-ene-16,17-dioic acid and 100 ml. of benzene. To this suspension was added 15 g. (3.42 equivalents) of the diethyl acetal of dimethylformamide and the resulting mixture was heated under reflux with stirring for 3 hours (the mixture became clear after about 40 minutes). The cooled reaction mixture was then filtered through a bed of Celite (made up in ether) and the filtrate was diluted with an equal volume of ether. The ether solution was then washed twice with 2 N hydrochloric acid, twice with 2 N sodium hydroxide, once with water, and was then dried ($Na_2SO_4$). Removal of the solvent under vacuum gave the product, the diethyl ester of 3β-hydroxy-16,17-secoandrost-5-ene-16,17-dioic acid, as a semicrystalline oil. One crystallization from ether-petroleum ether (Skelly B) gave 8.84 g. (78 percent) of product as an off-white solid, melting point 93–95.5° (vac.).

EXAMPLE 31

*Preparation of 1,2,3,4,4a,4b,5,6,7,8,10,10a-dodecahydro-7 - hydroxy - 2 - carbethoxy - 2,4b - dimethyl - 1-phenanthreneacetic acid*

In a 2 liter 3-neck flask fitted with a stirrer, condenser and stopper was added 34.0 g. of the diethyl ester prepared in Example 30 in 680 ml. of methanol and a solution of 34.0 g. of potassium hydroxide in 340 ml. of water. The resulting mixture was heated under reflux for exactly one hour. The reaction mixture was immediately cooled and then most of the solvents were removed under vacuum, taking care that the bath temperature did not rise above 45°. The resulting mixture was diluted with about one liter (or more) of water and was extracted twice with ether-methylene chloride (3:1) (more water may be necessary if all the solid does not go into solution). The product is now in the aqueous layer, and the organic layers are discarded.

The aqueous layer was then cooled in ice water and was acidified to congo red with about 500 ml. of 6 N hydrochloric acid. The resulting precipitate was filtered and washed well with water. The wet compound was crystallized from acetone-water (1:1) (dissolved in acetone and diluted with an equal volume of water) to give 24.67 g. (76 percent) of 1,2,3,4,4a,4b,5,6,7,8,10,10a - dodecahydro - 7 - hydroxy - 2 - carbethoxy - 2,4b-dimethyl-1-phenanthreneacetic acid, melting point 176.5–178° (vac.). The product must be dry for the next step.

EXAMPLE 32

*Preparation of the acetate of 1,2,3,4,4a,4b,5,6,7,8,10,10a-dodecahydro - 7 - hydroxy - 1 - chlorocarbonylmethyl-2,4b - dimethyl - 2 - phenanthrenecarboxylic acid ethyl ester*

To a solution of 185 g. of the dry half ester prepared in Example 31 in 1280 ml. of dry pyridine was added 785 ml. of distilled acetic anhydride and the reaction mixture was allowed to stand at room temperature for 48 hours.

The reaction mixture was then divided into two equal portions and each portion was poured into 3500 ml. of water. The resulting mixture was extracted 3 times with ether-methylene chloride (3:1) and the organic layers were washed 3 times with 2 N hydrochloric acid (one liter each time) and once with water. The organic layers were then combined and dried ($Na_2SO_4$). Removal of the solvent gave the acetate of 1,2,3,4,4a,4b,5,6,7,8,10,10a - dodecahydro - 7 - hydroxy - 2 - carbethoxy - 2,4b - dimethyl-1-phenanthreneacetic acid as a gummy solid (206 g., 100 percent), which was not purified further.

The above crude acetoxy acid (206 g.) was dissolved in 2000 ml. of benzene in a 5 liter 3-neck flask fitted with a stirrer, condenser (calcium chloride tube) and a dropping funnel. To the stirred solution was rapidly added 300 ml. of oxalyl chloride and the temperature of the reaction mixture was then maintained at 66–69° for 90 minutes by heating in an oil bath. An additional 50 ml. of oxalyl chloride was then added and heating and stirring was continued for an additional 30 minutes. The reaction mixture was then cooled and the solvents were removed under vacuum, taking care that the bath temperature does not go much higher than 45°. Do not overheat the dry residue.

The resulting residue was diluted with some benzene and was then evaporated to dryness. One further repetition of this procedure removed the last traces of oxalyl chloride. Approximately 300 ml. of petroleum ether (Skelly B) was added to the dry residue (oil) and the mixture was seeded. Do not heat, or try to crystallize. The resulting precipitate was filtered and washed with Skelly B to give 197 g. (91 percent) of the crude acetate of 1,2,3,4,4a,4b,5,6,7,8,10,10a - dodecahydro-7-hydroxy-1 - chlorocarbonylmethyl - 2,4b - dimethyl - 2 - phenanthrenecarboxylic acid ethyl ester, melting point 114–122°, which is sufficiently pure for the next step.

An analytical sample was crystallized from Skelly B and had a melting point of 130.5–132°.

EXAMPLE 33

*Preparation of the acetate of 1,2,3,4,4a,4b,5,6,7,8,10,10a-dodecahydro - 7 - hydroxy - 1 - isocyanatomethyl-2,4b-dimethyl - 2 - phenanthrenecarboxylic acid ethyl ester*

To a cold (5–10°) solution of 197 g. of the acid chloride prepared in Example 32 in 4 liters of acetone was added with vigorous stirring 154 g. of sodium azide in 620 ml. of water over a 20 minute period. The reaction mixture was then stirred in the cold for an additional 20 minutes and was then diluted with 3500 ml. of water. The reaction mixture was then extracted 4 times with 1200 ml. of benzene (each time). Then benzene layers were washed twice with 1500 ml. of water and once with 1500 ml. of saturated sodium chloride solution. The combined layers, which contain the acetate of 1,2,3,4,4a,4b,5,6,7,8,10,10a - dodecahydro - 7 - hydroxy - 1-azidocarbonylmethyl - 2,4b - dimethyl - 2 - phenanthrenecarboxylic acid ethyl ester, were dried ($Na_2SO_4$).

The benzene solution was then transferred to a 3-neck flask and about 250 ml. of benzene was distilled off under vacuum, to remove the last traces of water. The remaining benzene solution was then heated with stirring under reflux for 1.5 hours, until the evolution of gas ceased. The reaction mixture was then cooled and the solvent was concentrated to dryness under vacuum to give a yellow oil which crystallized upon addition of 200 ml. of Skelly B. Filtration gave 162 g. of crude solid which was crystallized from ether-Skelly B (1:10) to give 131 g. (70 percent) of the acetate of 1,2,3,4,4a,4b,5,6,7,8,10, 10a - dodecahydro - 7 - hydroxy - 1 - isocyanatomethyl-2,4b-dimethyl-2-phenanthrenecarboxylic acid ethyl ester, melting point 122–127° (vac.).

An analytical sample had a melting point of 127–128° (vac.).

EXAMPLE 34

*Preparation of 3β-hydroxy-16-azaandrost-5-en-17-one*

To a suspension of 100 g. of the isocyanate prepared in Example 33 in 940 ml. of methanol was added a solution of 100 g. of potassium hydroxide in 100 ml. of water. The reaction mixture became clear and warm and was allowed to stand at ambient temperature overnight. The reaction mixture was then evaporated under vacuum to about one quarter of the original volume and was then diluted with 2 liters of water. The resulting precipitate was filtered and washed with water. It was crystallized directly (without drying) by dissolving in 1 liter of ethanol (charcoaled), and concentrating to about 200 ml., whereupon 50.8 g. (71 percent) of 3β-hydroxy-16-azaandrost-5-en-17-one, melting point 272–274° (vac.) came out of the boiling solution. An additional 9.4 g. of product, melting point 266–272° (vac.), was obtained upon concentration of the mother liquors.

The pure product has a melting point of 272–274° (vac.).

I claim:
1. A compound which is either (*a*) a compound of the formula

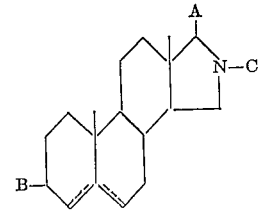

(I)

wherein C is hydrogen, $$-CH_2R, \text{ or } -\overset{O}{\underset{\|}{C}}R$$

A is hydrogen or oxo; B is hydroxy, oxo, or $$-O\overset{O}{\underset{\|}{C}}R$$

wherein R is hydrogen, lower alkyl, lower alkenyl, or cycloalkylloweralkyl, wherein the cycloalkyl group is a $C_3$–$C_7$ ring containing only the elements carbon and hydrogen; and not more than one of the dotted lines is a solid line, or (*b*) an acid addition salt of (*a*) with a pharmaceutically acceptable acid.

2. Acetate of 1,2,3,4,4a,4b,5,6,7,8,10,10a-dodecahydro - 7 - hydroxy - 1 - azidocarbonylmethyl - 2,4b - dimethyl-2-phenanthrenecarboxylic acid methyl ester.

3. Acetate of 1,2,3,4,4a,4b,5,6,7,8,10,10a-dodecahydro-7 - hydroxy - 1 - azidocarbonylmethyl - 2,4b - dimethyl-2-phenanthrenecarboxylic acid ethyl ester.

4. Acetate of 1,2,3,4,4a,4b,5,6,7,8,10,10a-dodecahydro-7 - hydroxy - 1 - isocyanatomethyl - 2,4b - dimethyl - 2- phenanthrenecarboxylic acid methyl ester.

5. Acetate of 1,2,3,4,4a,4b,5,6,7,8,10,10a-dodecahydro-7 - hydroxy - 1 - isocyanatomethyl - 2,4b - dimethyl - 2- phenanthrenecarboxylic acid ethyl ester.

6. 3$\beta$-hydroxy-16-azaandrost-5-en-17-one.
7. 16-azaandrost-4-en-3,17-dione.
8. 3$\beta$-hydroxy-16-azaandrost-5-ene.
9. A compound which is either (a) a compound of the formula

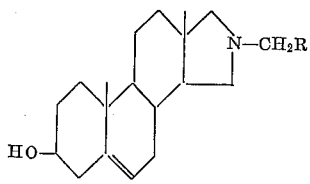

wherein R is hydrogen, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

10. A compound which is either (a) a compound of the formula

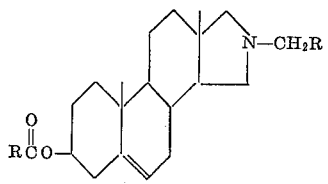

wherein R is hydrogen, phenyl, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

11. A compound which is either (a) a compound of the formula

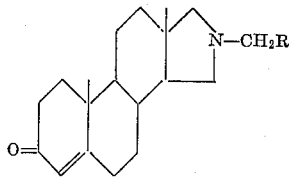

wherein R is hydrogen, phenyl, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

12. A compound which is either (a) a compound of the formula

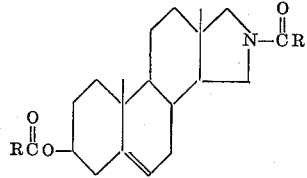

wherein R is hydrogen, phenyl, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

13. A compound which is either (a) a compound of the formula

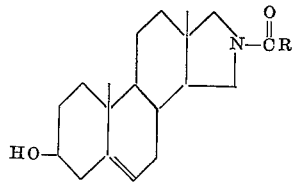

wherein R is hydrogen, phenyl, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

14. A compound which is either (a) a compound of the formula

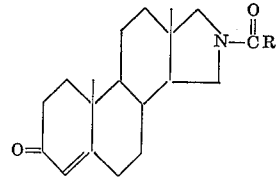

wherein R is hydrogen, phenyl, lower alkyl, lower alkenyl, or cycloalkylloweralkyl wherein the cycloalkyl group is a $C_3$–$C_7$ ring containing only the elements carbon and hydrogen, or (b) an acid addition salt of (a) with a pharmaceutically acceptable acid.

15. 3$\beta$-hydroxy-5$\alpha$-16-azaandrostan-17-one.
16. 3$\beta$-hydroxy-5$\alpha$-16-azaandrostane.
17. A compound which is either (a) a compound of the formula

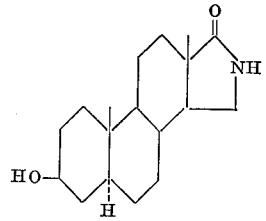

or (b) an acid addition salt of (a) with a pharmaceutically acceptable acid.

18. A compound which is either (a) a compound of the formula

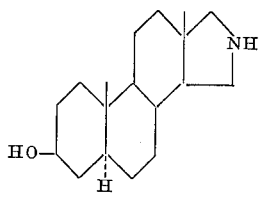

or (b) an acid addition salt of (a) with a pharmaceutically acceptable acid.

19. A compound which is either (a) a compound of the formula

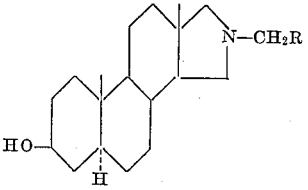

wherein R is hydrogen, lower alkyl, lower alkenyl, phenyl, or cycloalkylloweralkyl, wherein the cycloalkyl group is a $C_3$–$C_7$ ring containing only the elements carbon and hydrogen or (b) an acid addition salt of (a) with a pharmaceutically acceptable acid.

20. A compound which is either (a) a compound of the formula

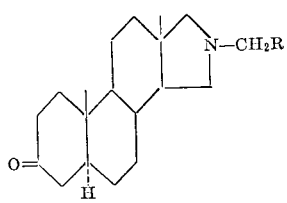

wherein R is hydrogen, lower alkyl, lower alkenyl, phenyl, or cycloalkylloweralkyl, wherein the cycloalkyl group is a $C_3$–$C_7$ ring containing only the elements carbon and hydrogen or (b) an acid addition salt of (a) with a pharmaceutically acceptable acid.

References Cited by the Examiner

Bartlett et al.: J. Am. Chem. Soc. (1954), vol. 76, page 1094.
Noller: Chemistry of Organic Compounds (1957), page 237.
Theilheimer: Synthetic Methods of Organic Chemistry (1962), page 162, article #342.
Wagner et al.: Synthetic Organic Chemistry (1953), pages 169, 481, and 546.

ALEX MAZEL, *Primary Examiner.*
JOSEPH A. NARCAVAGE, *Assistant Examiner.*

CERTIFICATE OF CORRECTION

Patent No. 3,317,557                                     May 2, 1967

Richard Wightman Kierstead

It is hereby certified that error appears in the above numbered patent requiring correction and that the said Letters Patent should read as corrected below.

Column 2, formula (IV), for that portion of the formula reading

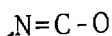     read     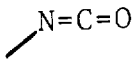

column 10, line 21, for "208-209°" read -- 208-209.5° --; column 11, line 65, for "9α,1α" read -- 9α,11α --; line 67, for "-6-" read -- -16- --; column 12, line 63, for "5-eene" read -- 5-ene --; column 14, line 42, for "-6-" read -- -16- --; column 18, line 39, for "3-hydroxy" read -- 3β-hydroxy --; column 20, line 6, for "combined layers" read -- combined benzene layers --; same column 20, lines 60 to 62, for

     read     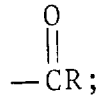

Signed and sealed this 15th day of October 1968.

(SEAL)
Attest:

EDWARD M. FLETCHER, JR.
Attesting Officer

EDWARD J. BRENNER
Commissioner of Patents